United States Patent
Surma et al.

(10) Patent No.: US 9,206,364 B2
(45) Date of Patent: Dec. 8, 2015

(54) GASIFICATION SYSTEM

(75) Inventors: Jeffrey E. Surma, Richland, WA (US); James A. Batdorf, Kennewick, WA (US)

(73) Assignee: InEnTec Inc., Bend, OR (US)

( * ) Notice: Subject to any disclaimer, the term of this patent is extended or adjusted under 35 U.S.C. 154(b) by 941 days.

(21) Appl. No.: 13/336,154

(22) Filed: Dec. 23, 2011

(65) Prior Publication Data

US 2012/0090237 A1 Apr. 19, 2012

Related U.S. Application Data

(63) Continuation of application No. 12/154,579, filed on May 23, 2008, now Pat. No. 8,118,892, which is a continuation-in-part of application No. 11/432,826, filed on May 12, 2006, now Pat. No. 7,854,775, and a continuation-in-part of application No. 12/008,956, filed on Jan. 14, 2008, now Pat. No. 8,118,891.

(51) Int. Cl.
*C10J 3/26* (2006.01)
*C10J 3/34* (2006.01)
*C10J 3/84* (2006.01)
(Continued)

(52) U.S. Cl.
CPC . *C10J 3/26* (2013.01); *C03B 5/005* (2013.01); *C03B 5/025* (2013.01); *C03B 5/027* (2013.01); *C10J 3/08* (2013.01); *C10J 3/40* (2013.01); *C10J 3/74* (2013.01); *C10J 3/84* (2013.01); *C10J 2200/12* (2013.01); *C10J 2200/152* (2013.01); *C10J 2300/0946* (2013.01); *C10J 2300/0956* (2013.01); *C10J 2300/0976* (2013.01); *C10J 2300/1238* (2013.01);
(Continued)

(58) Field of Classification Search
CPC ............... C10J 3/34; C10J 3/84; C10J 3/74; C10J 2300/1634; C10J 2300/0946; C10J 2300/0956; C10J 2300/0976; C10J 2300/12
See application file for complete search history.

(56) References Cited

U.S. PATENT DOCUMENTS 1,560,304 A  11/1925 Pardee
3,166,258 A   1/1965 Herbert
(Continued)

FOREIGN PATENT DOCUMENTS

GB   2116201 A       9/1983
WO   WO 01/05910 A1  1/2001
WO   WO 01/53434 A1  7/2001

OTHER PUBLICATIONS

Office Action dated Jun. 25, 2012 for Japanese Patent Application No. 2009-509535.
(Continued)

*Primary Examiner* — Matthew Merkling
(74) *Attorney, Agent, or Firm* — Dorsey & Whitney LLP

(57) ABSTRACT

A gasification system method and apparatus to convert a feed stream containing at least some organic material into synthesis gas having a first region, a second region, a gas solid separator, and a means for controlling the flow of material from the first region to the second region. The feed stream is introduced into the system, and the feed stream is partially oxidized in the first region thereby creating a solid material and a gas material. The method further includes the steps of separating at least a portion of the solid material from the gas material with the gas solid separator, controlling the flow of the solid material into the second region from the first region, and heating the solid material in the second region with an electrical means.

25 Claims, 4 Drawing Sheets

(51) Int. Cl.
   *C10J 3/40*    (2006.01)
   *C03B 5/00*    (2006.01)
   *C03B 5/02*    (2006.01)
   *C03B 5/027*   (2006.01)
   *C10J 3/08*    (2006.01)
   *C10J 3/74*    (2006.01)

(52) U.S. Cl.
   CPC ..... *C10J 2300/1276* (2013.01); *C10J 2300/16* (2013.01); *C10J 2300/1634* (2013.01)

(56) References Cited

U.S. PATENT DOCUMENTS

| | | | |
|---|---|---|---|
| 3,841,239 | A | 10/1974 | Nakamura et al. |
| 3,889,889 | A | 6/1975 | Sawa |
| 4,498,909 | A | 2/1985 | Milner et al. |
| 4,611,332 | A | 9/1986 | Santen |
| 4,631,384 | A | 12/1986 | Cornu |
| 4,831,944 | A | 5/1989 | Durand et al. |
| 4,874,587 | A | 10/1989 | Galloway |
| 4,886,001 | A | 12/1989 | Chang et al. |
| 5,034,021 | A | 7/1991 | Richardson |
| 5,078,327 | A | 1/1992 | Kemetter |
| 5,107,517 | A | 4/1992 | Lauren et al. |
| 5,666,891 | A | 9/1997 | Titus et al. |
| 5,756,957 | A | 5/1998 | Titus et al. |
| 5,798,497 | A | 8/1998 | Titus et al. |
| 5,811,752 | A | 9/1998 | Titus et al. |
| 5,847,353 | A | 12/1998 | Titus et al. |
| 5,958,264 | A | 9/1999 | Tsantrizos et al. |
| 6,037,560 | A | 3/2000 | Titus et al. |
| 6,066,825 | A | 5/2000 | Titus et al. |
| 6,199,778 | B1 | 3/2001 | Hanvey, Jr. |
| 6,987,792 | B2 | 1/2006 | Do et al. |
| 7,854,775 | B2 | 12/2010 | Surma et al. |
| 8,118,891 | B2 | 2/2012 | Surma et al. |
| 8,118,892 | B2 | 2/2012 | Surma et al. |
| 2002/0069798 | A1 | 6/2002 | Aguadas Ellis |
| 2002/0159929 | A1 | 10/2002 | Kaneko et al. |
| 2004/0159366 | A1 | 8/2004 | Tsangaris |
| 2004/0245086 | A1 | 12/2004 | Steynberg et al. |
| 2005/0116075 | A1 | 6/2005 | Bosch |
| 2005/0166810 | A1* | 8/2005 | Gnedenko et al. ............ 110/342 |
| 2006/0075945 | A1 | 4/2006 | Batdorf |
| 2007/0001045 | A1 | 1/2007 | Aizenberg |
| 2007/0006528 | A1 | 1/2007 | Diebold |
| 2007/0029421 | A1 | 2/2007 | Potts |
| 2007/0261303 | A1 | 11/2007 | Surma et al. |
| 2008/0104887 | A1* | 5/2008 | Tsangaris et al. ........... 48/197 R |
| 2008/0222956 | A1 | 9/2008 | Tsangaris |
| 2009/0000190 | A1 | 1/2009 | Surma et al. |
| 2009/0020637 | A1 | 1/2009 | Raaz et al. |
| 2009/0178337 | A1 | 7/2009 | Surma et al. |
| 2011/0056133 | A1 | 3/2011 | Surma et al. |
| 2012/0061618 | A1 | 3/2012 | Santoianni |
| 2012/0090237 | A1 | 4/2012 | Surma et al. |
| 2013/0145691 | A1 | 6/2013 | Surma et al. |

OTHER PUBLICATIONS

Office Action mailed Feb. 7, 2012 for Japanese Patent Application No. 2009-509535, Feb. 3, 2012, 1-4.
Office Action dated Jan. 25, 2012 for European Patent Application No. 06 774 325.2, Jan. 25, 2012, 5.
"International Search Report and Written Opinion, International Application PCT/US2006/025512 dated Apr. 4, 2008".
Antal, Jr., Michael J., "Synthesis gas production from organic wastes by pyrolysis/steam reforming", Energy from Biomass and Wastes Symposium, symposium papers presented Aug. 14-19, Washington, DC, Institute of Gas Technology, Chicago, 495.
Kaske, G. et al., "Hydrogen production by the Huls plasma-reforming process", Advanced Hydrogen Energy, vol. 5 (1986).
Office Action dated Oct. 19, 2012 from Canadian Patent Application No. 2,651,920.

* cited by examiner

GASIFICATION SYSTEM

CROSS REFERENCE TO RELATED APPLICATIONS

This application is a continuation of U.S. application Ser. No. 12/154,579 filed May 23, 2008, now U.S. Pat. No. 8,118,892 which is a continuation-in-part of U.S. application Ser. No. 11/432,826 filed May 12, 2006 for COMBINED GASIFICATION AND VITRIFICATION SYSTEM, now U.S. Pat. No. 7,854,775 and U.S. application Ser. No. 12/008,956 filed Jan. 14, 2008 for GRATE FOR HIGH TEMPERATURE GASIFICATION SYSTEMS, now U.S. Pat. No. 8,118,891.

TECHNICAL FIELD

This invention relates to methods and apparatus for gasifying materials. More specifically, this invention related to methods and apparatus for economically producing energy and responsibly disposing of waste material by gasifying and vitrifying waste material.

BACKGROUND OF THE INVENTION

There have been numerous examples of methods and apparatus for generating synthesis gas from waste materials. There have also been numerous examples of methods and apparatus for generating synthesis gas from waste materials while vitrifying the inorganic portion of the waste materials. These examples include systems described in US and foreign patents that were designed and developed by the inventors and assignee of the present invention as well as others.

Generally, all of these inventions have been designed to recover chemical energy stored in the waste materials in a usable form, typically synthesis gas, either for use as a fuel for powering an engine or as a feedstock for some other chemical operation. Accordingly, it is typical that these systems are operated with some oxidant, such as steam, air, or pure oxygen, to generate synthesis gas from the organic portion of the waste feed stream.

It is also typical that these systems have the dual purpose of providing long term safe storage of any hazardous inorganic portions of the waste materials. Accordingly, many of these systems will be operated in a manner that results in the inorganic portion of the waste feed streams being converted to a vitrified solid that will not leach hazardous constituents into the ground or into aquifers. Among these systems, the most effective in achieving this objective have been systems that allow for the introduction of energy, typically in the form of electrical energy, which is used to process the waste feed streams. As a result, these systems are both producers and consumers of energy. Accordingly, increasing the efficiency in the operation of these systems is an objective that those skilled in the art are always attempting to achieve.

Among these systems, it is also typical that the conversion of the synthesis gas and the solid vitrified material be accompanied by the production of a number of materials that are not desired. These materials include tars, oils, and carbon char that are typically found in the synthesis gas stream. Minimizing the production of undesirable tars, oils, and carbon char is an objective that those skilled in the art are also always attempting to achieve.

Thus, there is a need for improved methods and apparatus for generating synthesis gas from waste materials that achieve any or all of the following objectives: 1) provide greater efficiency in recovering chemical energy stored in the waste materials in a usable form, 2) provide greater efficiency in forming inorganic portions of the waste materials into a form suitable for long term safe storage of any hazardous constituents, and 3) minimize the production of undesirable tars, oils, and carbon char in the synthesis gas.

The present invention achieves all of these objectives.

SUMMARY OF THE INVENTION

The present invention is a method and apparatus for converting a feed stream containing at least some organic material into synthesis gas. In one aspect of the present invention, a gasification system is operated to provide a method for converting a feed stream containing at least some organic material into synthesis gas. In this aspect of the present invention, an electrically heated gasification system having a first region, a second region, a gas solid separator, and a means for controlling the flow of material from the first region to the second region is provided. The feed stream is introduced into the system, and the feed stream is partially oxidized in the first region thereby creating a solid material and a gas material. The method further includes the steps of separating at least a portion of the solid material from the gas material with the gas solid separator, controlling the flow of the solid material into the second region from the first region, and heating the solid material in the second region with an electrical means.

Another aspect of the present invention is a gasification system having a first and a second region. Feedstocks are introduced into the first region where they are partially oxidized. Typically, while not meant to be limiting, the feedstocks include waste materials having at least some organic matter. These waste materials may include, but are not limited to, solid waste as that term is defined under the Resource Conservation and Recovery Act (RCRA) Section 1004(27).

Typically, in a gasification system performing partial oxidation reactions, an effluent gas will be produced. Also typical for these systems, the effluent gas will contain solid materials. These solid materials include, without meaning to be limiting, oils, tars, and solid particulate matter such as carbon char. One aspect of the present invention is that the relative abundance of these solid materials in the effluent gas from the first region are reduced. To assist in achieving this reduction, the first region includes a gas solid separator.

As used herein a "gas solid separator" includes any device or method that separates, in whole or in part, any portion of a solid particulate material entrained in a gas stream from that gas stream. While it may be desirable to remove all of the solid particulate material from the effluent gas, it may be impractical, difficult or impossible to do so. Accordingly, it is not necessary that the gas solid separator of the present invention remove all of the solid particulate material. Rather, to achieve the advantages of this aspect of the present invention, the gas solid separator must simply separate at least some of the solid material, and thereby decrease the relative abundance of these solid materials in the effluent gas. As used herein a "gas solid separator" includes any device or method that is capable of providing this separation. While not meant to be limiting, it is preferred that the gas solid separator allow at least 50% of the gas from the first region to be directed away from the second region through at least one primary gas duct. The effectiveness of directing the gas away from the second region can be maximized by placing the primary gas duct proximate to the means of controlling flow from the first region to the second region.

The gasification system of the present invention further includes a second region heated by an electrical means and a means for controlling the rate of flow of the material from the first region into the second region. By providing the gas solid separator, the synthesis gas produced in the first region is cleaned and diverted away from the second region. In this manner, the energy consumption in the second region is minimized while still producing a clean synthesis gas.

The gas solid separator may be positioned anywhere that will allow the gas solid separator to minimize the amount of gas that flows to the second region. Accordingly, the gas solid separator may be positioned in a variety of locations in the first region and still achieve the benefits of the present invention. For example, and not meant to be limiting, the gas solid separator may be positioned between the second region and the means for controlling the rate of flow of the material from the first region into the second region. As a further example, and also not meant to be limiting, the gas solid separator may be positioned before the means for controlling the rate of flow of the material from the first region into the second region.

In certain embodiments of the present invention, the gasification system may also include a thermal residence chamber. The gas portion of the material produced in the first region of the present invention may then be routed to the thermal residence chamber. While not meant to be limiting, it is preferred that the step of heating the gas portion of the material in a thermal residence chamber is performed at a gas temperature at or above 1150° C. Also while not meant to be limiting, it is preferred that the gas portion of the material be maintained in the thermal residence chamber for an average residence time of at least 1 second.

While not meant to be limiting, the thermal residence chamber may further include a secondary ignition source in the thermal residence chamber. While not meant to be limiting, the secondary ignition source in the thermal residence chamber may be a plasma source.

The gas portion of the material produced in the first region of the present invention routed to the thermal residence chamber may be at or above the autothermal temperature of the gas. Alternatively, the gas portion of the material routed to the thermal residence chamber may be below the autothermal temperature of the gas.

While not meant to be limiting, in circumstances where the gas portion of the material is routed to the thermal residence chamber, it is preferred that the gas portion of the material routed to the thermal residence chamber is partially oxidized in the thermal residence chamber by providing a second oxidant in the thermal residence chamber and/or a secondary ignition source in the thermal residence chamber. While not meant to be limiting, the secondary ignition source in the thermal residence chamber may be a plasma source, and the plasma source may be operated intermittently, in a "pulse" mode.

In embodiments where a thermal residence chamber is provided, at least one primary duct is provided that allows a gas flow between the gasification system and the thermal residence chamber. These primary duct(s) may be positioned in a variety of locations that allow a gas flow between the first region and the thermal residence chamber.

For example, and not meant to be limiting, the gasification system may include at least one primary gas duct between the first region and the thermal residence chamber positioned to allow gas flow through the means for controlling the rate of flow of the material from the first region into the second region.

As another example, and also not meant to be limiting, the gasification system may include at least one primary gas duct between the first region and the thermal residence chamber positioned to allow gas flow to circumvent the means for controlling the rate of flow of the material from the first region into the second region.

As yet another example, and also not meant to be limiting, the gasification system may include a combination of both of the forgoing examples, such that at least one primary gas duct between the first region and the thermal residence chamber is positioned to allow gas flow through the means for controlling the rate of flow of the material from the first region into the second region, and at least one primary gas duct between the first region and the thermal residence chamber is positioned to allow gas flow to circumvent the means for controlling the rate of flow of the material from the first region into the second region.

Either alone or in combination with the primary ducts, the gasification system of the present invention may further include at least one secondary gas duct allowing gas flow between the second region and the thermal residence chamber.

The gasification system of the present invention may further include at least one primary oxidant port in the first region capable of allowing the introduction of at least one oxidant into the first region.

The present invention may further include at least one secondary oxidant port. The secondary oxidant ports may be provided in a variety of locations including, without limitation, one or more primary and secondary ducts connecting the gasification system to the thermal residence chamber, the thermal residence chamber, or combinations thereof.

To assist in the partial oxidation reactions, suitable oxidants may be introduced into the primary and secondary oxidant ports. Suitable oxidants include, but are not limited to, steam, mist, oxygen, air, and combinations thereof.

Preferably, but not meant to be limiting, the means for controlling the rate of flow of material is selected from the group of an active grate, an auger, a rake, an agitating grate, one or more rotating drums, a piston, and combinations thereof. More preferably, the means for controlling the rate of flow of material is an active grate as described in co-pending U.S. patent application Ser. No. 12/008,956 filed Jan. 14, 2008 entitled "GRATE FOR HIGH TEMPERATURE GASIFICATION SYSTEMS."

Controlling the flow of the solid material into the second region from the first region may be performed by changing the space through which material passes in the active grate. The space through which the material passes may be changed, for example, according to a sensed parameter. The sensed parameter may be selected from temperature, composition of the gas, the rate of introduction of feedstock into the first region, and combinations thereof.

The electrical means for heating the second region of the gasification system of the present invention is selected from the group joule heating, plasma heating, and combinations thereof.

BRIEF DESCRIPTION OF THE DRAWINGS

The following detailed description of the embodiments of the invention will be more readily understood when taken in conjunction with the following drawing, wherein.

DETAILED DESCRIPTION OF THE PREFERRED EMBODIMENTS

Figure 1:
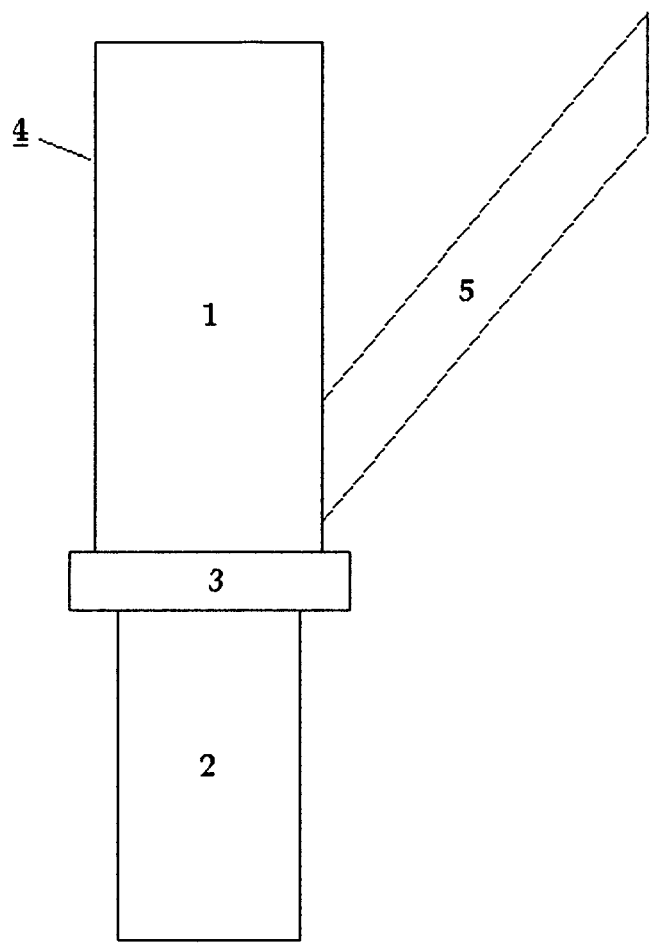
FIG. 1 is an illustration of a simple form of the gas solid separator used in the present invention.

For the purposes of promoting an understanding of the principles of the invention, reference will now be made to the embodiments illustrated in the drawings and specific language will be used to describe the same. It will nevertheless be understood that no limitations of the inventive scope is thereby intended, as the scope of this invention should be evaluated with reference to the claims appended hereto. Alterations and further modifications in the illustrated devices, and such further applications of the principles of the invention as illustrated herein are contemplated as would normally occur to one skilled in the art to which the invention relates.

FIG. 1 is an illustration of the gasification system 4 of the present invention showing a simple form of the gas solid separator 5 used in the present invention. While this example of the gas solid separator 5 is not necessarily the preferred embodiment of this aspect of the present invention, it is useful to illustrate the range of possibilities for this aspect of the present invention. As shown in FIG. 1, gasification system 4 consists of a first region 1 connected to an active grate 3 which is in turn connected to a second region 2. Materials are introduced into first region 1 where they are partially oxidized. Solid materials from first region 1 are then transferred to second region 2 through active grate 3.

Protruding from first region 1 is gas solid separator 5. As shown, gas solid separator 5 projects in a generally upward angle away from active grate 3 and second region 2. Gas from first region 1 is flowed through gas solid separator 5 and is thereby directed up and away from active grate 3 and second region 2. Simultaneously, solid materials in the gas flow are pulled by gravity out of the gas flow, and are instead directed through active grate 3 and second region 2. In this manner, gas solid separator 5 acts to separate solid materials entrained in the gas stream from the gas stream and to direct the gas away from region 2. Simultaneously, gas solid separator 5 acts to separate solid materials entrained in the gas stream from the gas stream and to instead direct those materials through active grate 3 and into region 2.

Figure 2:
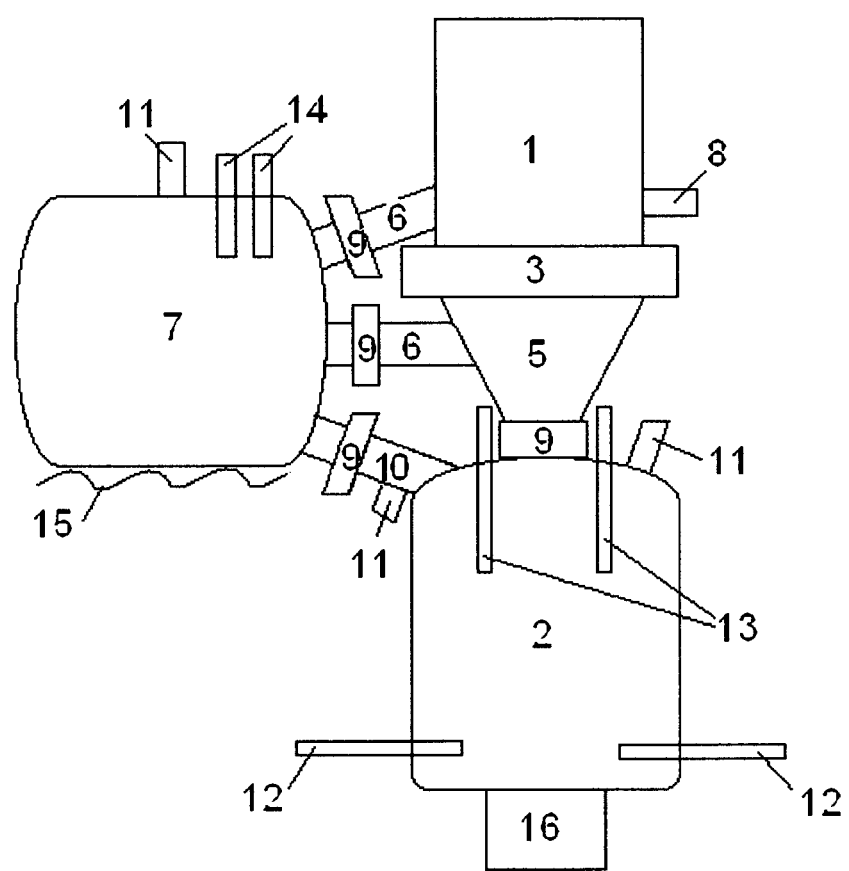
FIG. 2 is an illustration of a preferred embodiment the present invention.

FIG. 2 is an illustration of a preferred embodiment of the gasification system 4 of the present invention. As shown in FIG. 2, gasification system 4 consists of a first region 1 connected to a means for controlling the rate of flow of material, which could be an active grate, an auger, a rake, an agitating grate, one or more rotating drums, a piston, and combinations thereof. As shown in the Figure, the means is an active grate 3 which is in turn connected to a second region 2. Materials are introduced into first region 1 where they are partially oxidized. The flow of solid materials in first region 1 are is controlled by active grate 3.

Just below active grate 3 is gas solid separator 5. As shown, gas solid separator 5 has a conical shape projects in a generally downward direction connecting active grate 3 with second region 2. Solid materials are partially oxidized in first region 1, flow through active grate 3, continue through gas solid separator 5, and are finally transferred into second region 2. Accordingly, in this embodiment, active grate 3 and gas solid separator 5, may be considered as forming a part of first region 1.

In the embodiment shown in FIG. 2, (but not meant to be limiting), gas solid separator 5 has two primary gas ducts 6. The first primary gas duct 6 connects first region 1 and thermal residence chamber 7 at a point above active grate 3. The second primary gas duct 6 connects first region 1 and thermal residence chamber 3 at a point below active grate 3, at gas solid separator 5.

Figure 3:
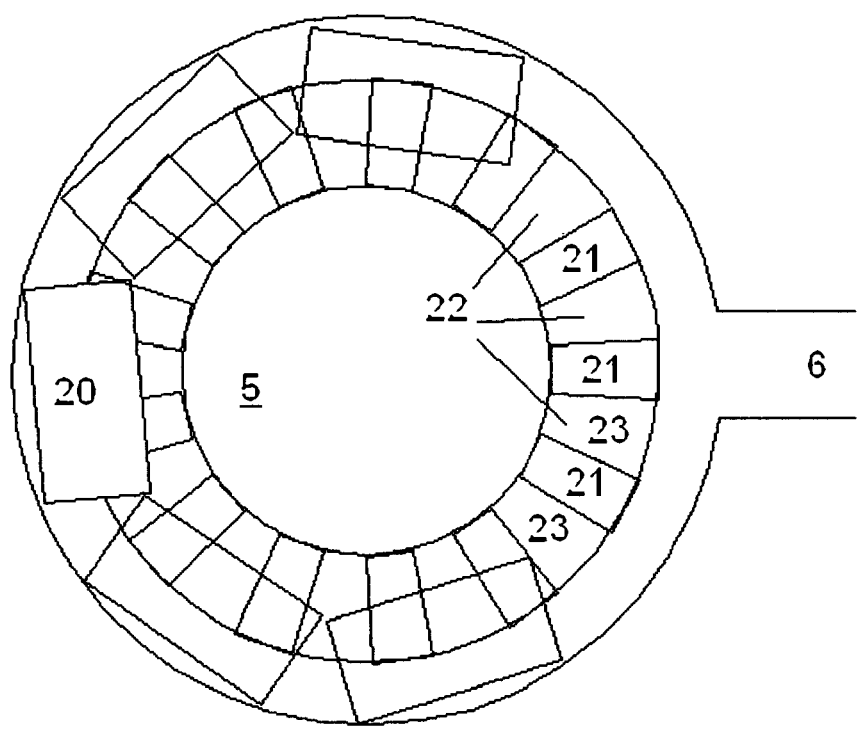
FIG. 3 is an overhead, partial cutaway view of the interior arrangement of refractory materials inside gas solid separator of a preferred embodiment of the present invention shown in FIG. 2.
Figure 4:
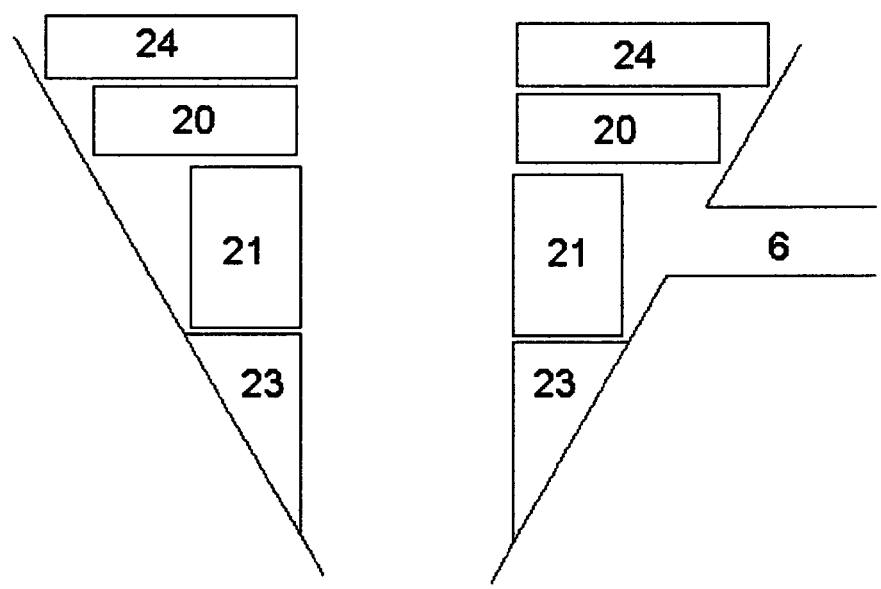
FIG. 4 is a side cutaway view of the interior arrangement of refractory materials inside gas solid separator of a preferred embodiment of the present invention shown in FIG. 2.

Gas from first region 1 is flowed through primary gas ducts 6 and is thereby directed away from second region 2. Simultaneously, solid materials are directed through gas solid separator 5 and into second region 2. The internal operation of gas solid separator 5 is not shown in FIG. 2, but is shown in FIGS. 3 and 4, and is described in greater detail below. In this manner, gas solid separator 5 acts to separate solid materials entrained in the gas stream from the gas stream and to direct the gas away from region 2. Simultaneously, gas solid separator 5 acts to separate solid materials entrained in the gas stream from the gas stream and to instead direct those solid materials into region 2.

At least one primary oxidant port 8 is provided in the first region 1. An oxidant is selected from the group of steam, mist, oxygen, air, and combinations thereof may be introduced through this primary oxidant port 8 to assist in the promotion of partial oxidation reactions.

At least one primary gas duct 6 is provided allowing gas flow between the gasification system and the thermal residence chamber. Primary gas duct 6 may be positioned to allow gas flow directly between the first region 1 and the thermal residence chamber 7, or between the first region 1 and the thermal residence chamber 7 such that the gas flows through the means for controlling the rate of flow of the material from the first region into the second region, shown in the figure as active grate 3.

At least one secondary gas duct 10 is provided, allowing gas flow between the second region 2 and the thermal residence chamber 7.

At least one secondary oxidant port 11 is provided. As shown in the figure, the secondary oxidant port 11 may be provided in the thermal residence chamber 7, or in one or more of the primary and secondary ducts connecting the gasification system 4 to the thermal residence chamber 7.

An electrical means for heating the second region is provided. This electrical means can be joule heating 12, plasma heating 13, and combinations thereof. One or more drains 16 are provided to allow metals and/or glass materials to be removed from second region 2.

An ignition source 14 may further be provided in the thermal residence chamber 7. This ignition source 14 may be a plasma source, and may further be operated in a "pulse" mode, whereby power is intermittently provided to the ignition source 14 so that a plasma is intermittently formed in the thermal residence chamber 7. In this manner, partial oxidation reactions are promoted within the thermal residence chamber 7.

Finally, during operation of the system 4, and particularly at startup and shut down of the system 4, the first region 1, second region 2, and thermal residence chamber 7, may heat and cool at different rates, thereby expanding and contracting at different rates. To accommodate differences in this expansion and contraction, expansion joints 9 may be provided, and thermal residence chamber 7 may be mounted on a flexible spring mount 15, to provide sufficient elasticity between the first region 1, the second region 2, and thermal residence chamber 7.

FIGS. 3 and 4 shows the interior arrangement of refractory materials inside gas solid separator 5 of the preferred embodiment shown in FIG. 2. FIG. 3 presents an overhead, partial cutaway view, and FIG. 4 presents a side, cutaway view. As shown in FIG. 3, the interior of gas solid separator 5 contains horizontal refractory 20, vertical refractory 21, and shelf 23.

As shown in FIGS. 3 and 4, horizontal refractory 20 rests upon vertical refractory 21, which in turn rests upon the shelf 23. To better illustrate the arrangement inside the gas solid separator 5 of the preferred embodiment shown in FIG. 2, in FIG. 4, the left hand side of FIG. 3 shows the horizontal refractory 20 as opaque, hiding the vertical refractory 21, and shelf 23. On the right hand side of FIG. 3, the horizontal refractory 20 has been removed, to better show the arrangement of vertical refractory 21, and shelf 23, and to show the interstitial regions 22 through which gas may flow to exit the gas solid separator 5 through primary gas duct 6.

As shown in FIG. 4, a ring of refractory material 26 is provided on top of horizontal refractory 20 to eliminate any gaps between adjacent bricks. Additionally, as those having ordinary skill in the art will recognize, the ring of refractory material 26, horizontal refractory, vertical refractory 21 and shelf 23 may all be held in place with mortar.

The upper and lower portions of FIG. 3 shows a transparent view of the horizontal refractory 20, the vertical refractory 21, and the shelf 23, allowing the viewer to better see the spatial relationship between each of these elements. As a result of the arrangement of the horizontal refractory 20 and vertical refractory 21, as solid and gaseous materials travel downward through gas solid separator 5, solid materials are inclined to follow the direct, downward path toward the second region 2, as a result of their momentum and gravity. In contrast, gasses are more inclined to flow through to the interstitial regions 22, and then to exit the gas solid separator 5 through primary gas duct 6. In this manner, gas solid separator 5 effectively separates solid materials from gasses, and flows a larger proportion of solid materials toward the second region 2, and a larger proportion of the gasses toward thermal residence chamber 7.

While the invention has been illustrated and described in detail in the drawings and foregoing description, the same is to be considered as illustrative and not restrictive in character. Only certain embodiments have been shown and described, and all changes, equivalents, and modifications that conic within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" or "output" is used in connection with an electric device or fluid processing unit, it should be understood to comprehend singular or plural and one or more signal channels or fluid lines as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein.

We claim:

1. A method for producing synthesis gas from a feed stream containing at least some organic material, the method comprising:
   introducing the feed stream into a first region of a gasification system;
   partially oxidizing the organic material in the feed stream to produce an effluent of solid material and gas material;
   introducing the solid material and at least a portion of the gas material into a gas solid separator disposed between the first region and a second region of the gasification system;
   separating at least a first portion of the gas material from the solid material and directing at least some of the first portion of gas material into a thermal residence chamber before introducing the solid material to the second region of the gasification system;
   controlling the flow of the solid material into the second region;
   separating a second portion of the gas material by allowing flow of the second portion of the gas material from the second region into the thermal residence chamber; and
   electrically heating the solid material in the second region.

2. The method of claim 1, wherein said separating comprises flowing the first portion of the gas material through a primary gas duct disposed proximate an outlet of the first region.

3. The method of claim 1, wherein said separating comprises flowing the first portion of the gas material through a primary gas duct disposed downstream of a controller mechanism operable to control a rate of flow of the solid material into the second region.

4. The method of claim 1, wherein said separating comprises directing at least 80% of the gas material to the thermal residence chamber.

5. The method of claim 1, wherein the thermal residence chamber is at or above an autothermal temperature of the gas.

6. The method of claim 1, wherein the thermal residence chamber is below an autothermal temperature of the gas, the method further comprising partially oxidizing the gas by providing a second oxidant in the thermal residence chamber.

7. The method of claim 1, wherein said separating comprises directing at least a portion of the gas material to a thermal residence chamber, wherein the gas is at a temperature of 1150° C. or greater.

8. The method of claim 1, further comprising maintaining an average residence time of gas within the thermal residence chamber of at least 1 second.

9. The method of claim 1, wherein said controlling comprises varying a size of an opening through which the flow of solid materials passes before entering the second region.

10. The method of claim 1, wherein said controlling is based in part on a sensed parameter.

11. The method of claim 10, wherein the sensed parameter includes one or more of temperature, composition of the gas, a rate of introduction of the feed into the first region, or combinations thereof.

12. The method of claim 1, wherein said controlling comprises passing the solid material through an active grate.

13. The method of claim 1, wherein said electrically heating includes using joule heating, and further comprises plasma heating the solid material in the second region.

14. The method of claim 1, further comprising providing at least one oxidant to one or more of the first region, the second region, or the thermal residence chamber fluidly coupled with at least one or more of the first region, or the second region.

15. The method of claim 14, wherein the at least one oxidant comprises steam, mist, oxygen, air, or combinations thereof.

16. The method of claim 1, further comprising heating the thermal residence chamber using a plasma source.

17. A method for converting waste into synthesis gas, the method comprising:
   providing a feed stream including organic materials into a gasification unit which includes a first region, a second region, a gas solid separator, and an active grate configured to control a flow of solid material into the gas solid separator, with each of the gas solid separator and the active grate being disposed between the first region and the second region;
   partially oxidizing the organic materials in the first region to produce the flow of solid material and gas material;
   separating a portion of the gas material before the flow is passed into the second region and diverting the at least some of the portion into a thermal residence chamber, at least some of the portion being separated from the flow after the gas material has passed through the active grate but before the flow enters the second region;
   controlling a rate of movement of the flow into the second region; and
   heating the solid material in the second region using an electrical heat source.

18. The method of claim 17, wherein said separating comprises flowing at least some of the portion of the gas material out of the first region before the flow of solid material and gas material passes through the active grate.

19. The method of claim 17, further comprising flowing a second portion of the gas material out of the second region.

20. The method of claim 17, wherein said separating comprises directing at least 80% of the gas material out of the first region.

21. The method of claim 17, further comprising providing the separated gas into the thermal residence chamber for an average gas residence time within the thermal residence chamber of at least 1 second.

22. The method of claim 17, wherein said varying is based on a sensed parameter.

23. The method of claim 22, wherein the sensed parameter includes one or more of temperature, composition of the gas, the rate of introduction of feedstock into the first region, or combinations thereof.

24. The method of claim 17, further comprising heating the solid material using plasma.

25. A method for producing synthesis gas from a feed stream containing at least some organic material, the method comprising:
   introducing the feed stream into a first region of a gasification system having a first region, a second region, a gas solid separator, and an active grate configured to control a flow of solid material into the gas solid separator, with each of the gas solid separator and the active grate being disposed between the first region and the second region;
   partially oxidizing the organic material in the feed stream to produce an effluent of solid material and gas material;
   separating at least a first portion of the gas material from the solid material and directing at least a portion of the first portion of gas material into a thermal residence chamber via one or more of a first primary gas duct operably coupled to the first region or a second primary gas duct operably coupled to the gas solid separator before introducing the solid material into the second region of the gasification system;
   controlling the flow of the solid material into the second region via the active grate;
   separating a second portion of the gas material by allowing flow of the second portion of the gas material from the second region into the thermal residence chamber via a secondary gas duct operably coupled thereto; and
   electrically heating the solid material in the second region.

* * * * *